(12) United States Patent
Lemacks (10) Patent No.: US 10,288,106 B2
(45) Date of Patent: May 14, 2019

(54) FASTENING SYSTEM ALLOWING COMPONENT REMOVAL AFTER FASTENER SYSTEM FAILURE

(71) Applicant: Channell Commercial Corporation, Temecula, CA (US)

(72) Inventor: Michael A. Lemacks, Temecula, CA (US)

(73) Assignee: Channell Commercial Corporation, Temecula, CA (US)

( * ) Notice: Subject to any disclaimer, the term of this patent is extended or adjusted under 35 U.S.C. 154(b) by 234 days.

(21) Appl. No.: 15/177,277

(22) Filed: Jun. 8, 2016

(65) Prior Publication Data

US 2017/0023046 A1    Jan. 26, 2017

Related U.S. Application Data

(60) Provisional application No. 62/194,716, filed on Jul. 20, 2015.

(51) Int. Cl.
| | |
|---|---|
| *F16B 37/00* | (2006.01) |
| *F16B 33/00* | (2006.01) |
| *F16B 37/04* | (2006.01) |
| *F16B 5/02* | (2006.01) |

(52) U.S. Cl.
CPC .......... *F16B 33/006* (2013.01); *F16B 5/0225* (2013.01); *F16B 37/005* (2013.01); *F16B 37/044* (2013.01)

(58) Field of Classification Search
CPC ..... F16B 33/006; F16B 37/005; F16B 37/044
USPC ......... 411/9–4, 907, 908, 301, 103, 111–113
See application file for complete search history.

(56) References Cited

U.S. PATENT DOCUMENTS

| | | | | |
|---|---|---|---|---|
| 2,775,916 | A | * | 1/1957 | Baxter .................... F16B 33/02 411/427 |
| 2,832,391 | A | | 4/1958 | Clark |
| 4,632,269 | A | | 12/1986 | Rose |
| 4,717,302 | A | * | 1/1988 | Adams .................... B29C 70/24 411/378 |
| 4,768,907 | A | * | 9/1988 | Gauron ................. F16B 37/044 411/112 |
| 5,006,025 | A | | 4/1991 | Duran |

(Continued)

FOREIGN PATENT DOCUMENTS

| | | |
|---|---|---|
| AU | 2006100511 A4 | 7/2006 |
| AU | 2013206585 A1 | 3/2014 |

(Continued)

OTHER PUBLICATIONS

Examination report No. 1 issued in parallel Australian Application No. 2016204289 dated Mar. 30, 2017, 8 pages.

(Continued)

*Primary Examiner* — Flemming Saether
(74) *Attorney, Agent, or Firm* — Lewis Roca Rothgerber Christie LLP (57) ABSTRACT

A fastening system for attaching a cover to an underground vault having a bolt with threads and a composite fiber reinforced polymer nut having a thread engagement portion extending through the nut which will fail in shear after the bolt is inserted before the nut and bolt seize. The fastening system can also include a nut retainer sized to allow the nut to float within the retainer.

17 Claims, 5 Drawing Sheets

(56) References Cited

U.S. PATENT DOCUMENTS

| | | | | |
|---|---|---|---|---|
| 5,083,888 A * | 1/1992 | Gapp | ............... | B29C 70/202 |
| | | | | 411/427 |
| 5,431,518 A * | 7/1995 | Young | ............... | F16B 33/004 |
| | | | | 411/429 |
| 5,746,561 A | 5/1998 | Nygren, Jr. et al. | | |
| 6,171,041 B1 * | 1/2001 | Bazinski | ............... | F16B 4/006 |
| | | | | 411/180 |
| 6,659,698 B2 | 12/2003 | Kirchen et al. | | |
| 7,963,726 B2 | 6/2011 | Boot | | |
| 8,353,649 B2 * | 1/2013 | Csik | ............... | F16B 37/045 |
| | | | | 411/108 |
| 9,303,678 B2 * | 4/2016 | Ducornait | ............... | F16B 39/284 |
| 9,353,779 B2 * | 5/2016 | Hendrix | ............... | F16B 5/025 |
| 2005/0153597 A1 | 7/2005 | Schaty | | |
| 2008/0292425 A1 | 11/2008 | Pineiros et al. | | |
| 2009/0155017 A1 | 6/2009 | Wittman | | |
| 2015/0299422 A1 * | 10/2015 | El-Hibri | ............... | C08K 3/38 |
| | | | | 411/378 |

FOREIGN PATENT DOCUMENTS

| | | |
|---|---|---|
| CA | 1278202 C | 12/1990 |
| CN | 2549123 Y | 5/2003 |
| DE | 28 02 465 A1 | 7/1979 |
| DE | 3640208 A1 | 4/1987 |
| EP | 1 348 877 A1 | 10/2003 |
| EP | 2 703 659 A1 | 3/2014 |
| JP | H03-005749 U | 1/1991 |
| JP | 2004-308169 A | 11/2004 |
| JP | 2007-239428 A | 9/2007 |

OTHER PUBLICATIONS

Notice of Reasons for Rejections with English translation issued in corresponding Japanese Application No. 2016-134003, dated Jun. 27, 2017, 9 pages.

First Office action issued in parallel Chinese Application No. 201610570109.8, dated Feb. 5, 2018, 9 pages, along with English Translation.

Communication with European Search Report issued in parallel EP Application 16180127 dated Nov. 18, 2016;dated Dec. 5, 2016; 7 pages.

IPOS Search Report and Written Opinion issued in parallel Singapore Application No. 10201605845Y, dated Jan. 31, 2018, 10 pages.

First Examination Report issued in parallel New Zealand Application 721968 dated Aug. 18, 2016; 4 pages.

First Office action issued in parallel Ukrainian Application No. 2016 06430, dated Jan. 18, 2018, 7 pages, along with English Translation.

* cited by examiner

FASTENING SYSTEM ALLOWING COMPONENT REMOVAL AFTER FASTENER SYSTEM FAILURE

CROSS-REFERENCE TO RELATED APPLICATIONS

This application claims the benefit of and priority to U.S. Provisional Patent Application Ser. No. 62/194,716 filed Jul. 20, 2015 the contents of which are incorporated herein by reference.

FIELD OF THE INVENTION

The Invention relates to a fastener system for a lid or cover used on an underground or grade-level vault used in various underground industries.

BACKGROUND

Underground or buried vaults, pits chambers or boxes used in the utilities, security, and rail line sectors or other industries can contain co-axial or optical fiber, copper cable as well as gas and power lines and other conduits, industrial valves, WI-FI antennas, etc. Vaults and pits for underground utilities often need to be opened for making repairs or for enhancing services. Typically, utility vaults and pits include a concrete, polymer concrete, or plastic lid which is opened by a tool or pick with a hook at one end. The hook is inserted through a hole in the lid or cover and is used for prying the lid or cover away from it's opening atop the vault or pit.

In the course of using the underground box the cover or lid may be installed at approximately grade level. These covers or lids of various materials such as plastic, concrete, polymer concrete and fiber reinforced composites are secured in place by various means such as straight bolts or L-bolts etc. The bolt typically passes through the cover and into the underground box where it is screwed into a retained nut or similar device thus fastening the cover to the box. This fastening system is highly prone to failure and a great many of the installed box/cover units are deliberately damaged to regain entry into the box chamber and access internal infrastructure such as copper or fiber-optic enclosures. The damage is typically, but not limited to, breaking the corners of the cover where the bolts which are typically positioned onto opposing corners attach the cover to the box. This of course means that the cover is no longer secured to the box and the cover is significantly weakened to the point that it would not likely pass load requirements regulated for that installation proximity to the vehicular loading. As the cover is no longer secured by the bolts, which typically include tamper-resistant features such as "Penta" head designs which require specialized tools for access not commonly available, the utility vault is subject to vandalism, theft or unwanted damage due to the fact that ready access to the infrastructure which was intended to be protected by such security features is readily available.

Failure of the fastening systems typically occurs by two mechanisms wherein either the bolt and nut becomes seized together and the bolt cannot be turned for removal, or the bolt and nut become seized and the nut breaks free of its retainer and spins with the bolt as it is turned. In some systems there is an additional failure mode where the bolt threads are stripped and the bolt cannot be removed. All of these situations prevent removal of the cover and lead technicians to break the cover to gain access. Further exacerbation of this problem is the recent development and deployment of advanced composite materials, used to manufacture the covers, which cannot be broken at the corners as older materials could and require extreme measures to re-enter the box if the retaining systems fail. These scenarios are common place and prevalent across all infrastructure companies deploying underground boxes including but not limited to, telecommunications, transportation, energy distribution and other utilities.

Various attempts to solve the fastening system failure have been tried. For example, to address some aspects of bolt/nut seizure such as when stainless steel nuts and bolts gall causing them to seize, either the nut or bolt has been substituted with a brass nut or bolt or an anti-seize compound is added to prevent stainless on stainless galling. However, while galling can be an issue, a much larger problem is thread contamination with particulates especially sand, soil, cement and granules of polymer concrete. As these installations are in soil or sidewalks, particulates are almost always contaminating the threads and the addition of anti-seize compounds give the particulates a grease-like compound to adhere to and carry them into the bolt/nut thread interface. Thus, most of the failures are due to contamination of the threads and the current solutions do not address this problem.

Therefore a need exists for an improved fastening system for attaching a lid or cover to an underground or buried vault, pit, chamber or box which addresses the drawbacks of previous fastening systems and which allow for gaining entry into the chamber of the box without damaging the lid or cover.

SUMMARY OF THE INVENTION

The present invention is a fastening system for a cover or lid for an underground or buried vault, pit, chamber or box which addresses the problems of prior fastening systems and can easily and inexpensively provide for entry into the chamber of the box without damaging the lid. The present invention is a fastening system, comprising a nut and bolt arrangement that reduces the chance of failure, and when failure occurs the failure mode is changed such that the vault can still be entered into without damage to the cover or the box, and the failed component can be easily and cheaply replaced. The fastening system of the present invention provides for two types of nut retention designs deployed within underground boxes and covers wherein one is a fixed nut attachment to the box where the nut remains stationary, and the second is a floating nut design where the nut is allowed to move within a track or cage in the box to compensate for some degree of misalignment.

The failure mode of the fastening system of the present invention has been moved to the threads contained by the nut such that the bolt, nut retainer and nut attachment points remain intact. In this embodiment the nut strips out without damaging anything else. By careful selection of materials for the nut, bolt and retainer from which the fastener is made, the desired mode of failure is realized and the properties of the failure mode are designed to affect useful outcomes, specifically the threads and the nut strip prior to any other failure mode.

The materials used for the nut are of a composite type such as, but not limited to, glass-filled nylon which exhibits good strength but allows the nut threads to shear prior to any other mode of failure. By controlling the length of thread engagement and the hole diameter relative to the bolt diameter, the fastener is able to meet torque requirements and still allow the nut threads to fail first. By adjustment of material, hole diameter and thread engagement the desired failure mode is achieved. Due to the high-stress risers in the nut during thread formation, appropriate lead chamfers are required to prevent fracture of the nuts, typically a 45 degree chamfer of 1/16th inch to 1/8th inch across the flat.

In conjunction with the material selection for the component, certain geometries especially at component interfaces are optimized to assure failure occurs in the desired mode and in the desired component. A very course lag-bolt type thread can be used as they are good at forming threads in the composites and allow the nut material to achieve the required high-torque limits that ultimately fail in shear. These and other aspects of the present invention will be more clearly understood by reference to the following detailed description and drawings.

DETAILED DESCRIPTION

Figure 1:
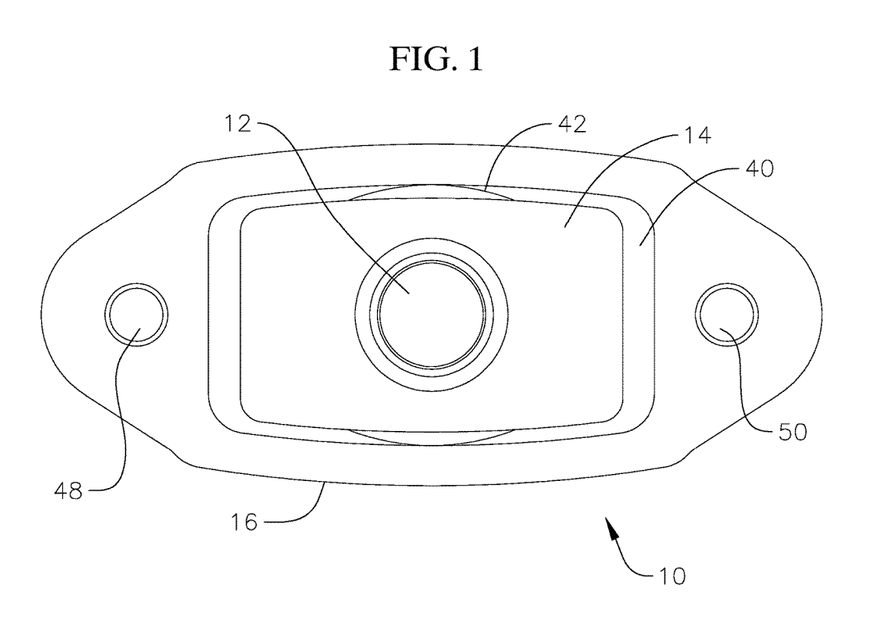
FIG. 1 the top view of the fastening system of the present invention.
Figure 2:
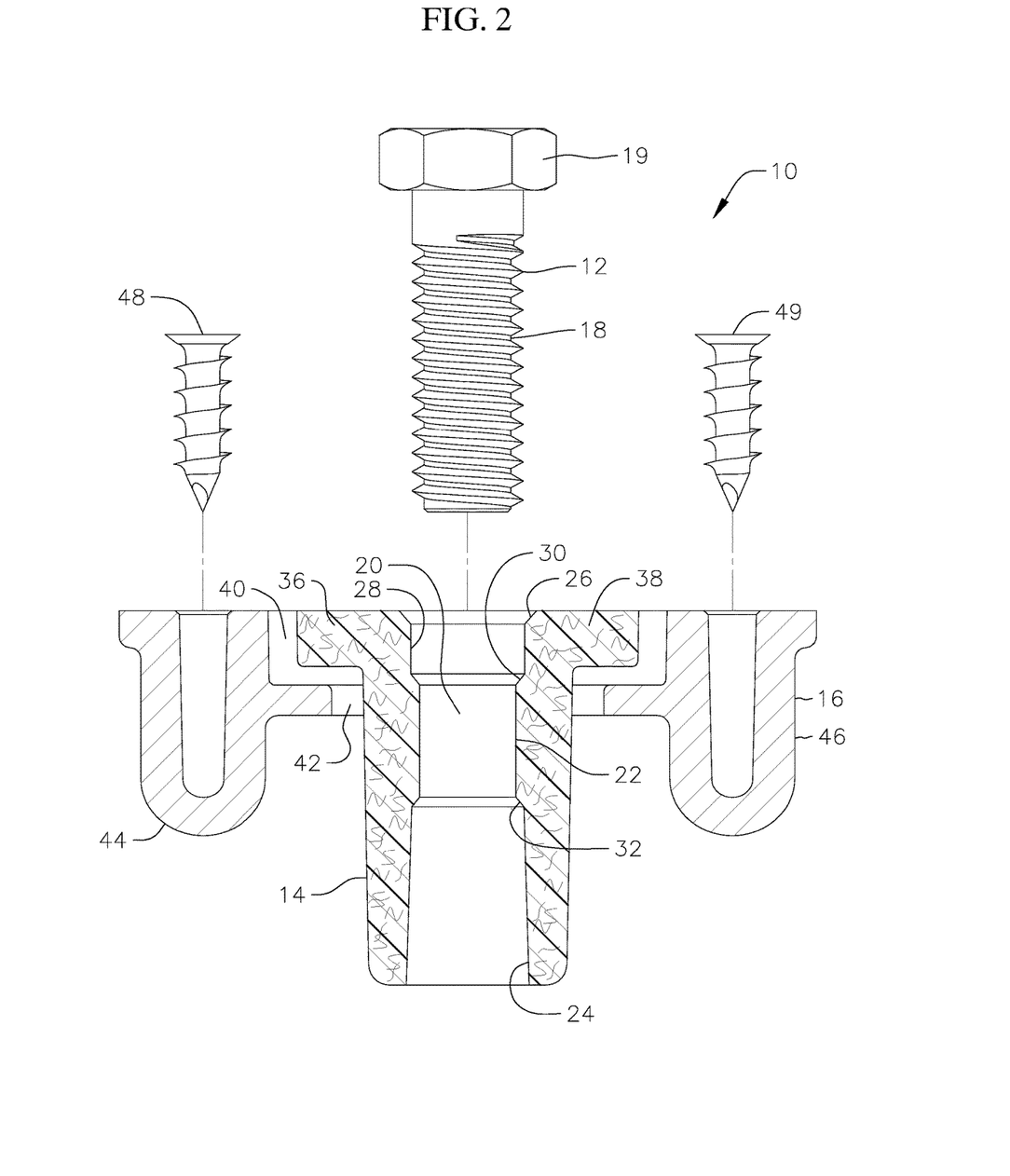
FIG. 2 is a partial cross-sectional view of the fastenings system of FIG. 1.

Referring to FIGS. 1 and 2 the fastening system 10 of the present invention is illustrated. The fastening system comprises a bolt 12, a nut 14 and a nut retainer 16. The fastening system 10 is utilized to attach a lid or cover to an underground or grade-level vault, pit, chamber or box which will be discussed in more detail subsequently herein. Bolt 12 is typically a lag bolt having course threads 18 for engagement with the nut 14 positioned in a thread engagement section 22 of a hole 24 extending through the nut. The threads of the bolt will cut into the thread engagement section of the nut during installation thereby forming threads in the nut.

The bolt 12 includes a head 19 which can be a traditional head design or can include tamper-resistant features such as, for example, a Penta head design which requires specialized tools to manipulate. Bolts with fine threads can also be utilized for the fastener. Hole 24 extending through the nut includes a bolt lead-in chamfer 26 extending to a bolt alignment section 28 which extends to a thread engagement section lead-in chamfer 30 positioned between the bolt alignment section 28 and thread engagement section 22. A lead-out chamfer 32 extends from the thread engagement section to a bolt shroud section 34 of the nut. The nut further includes lobes 36 and 38 on either side of an upper portion of the nut adjacent lead-in chamfer 26 and bolt alignment section 28. The lobes could also be positioned along other portions of the nut.

The nut 14 is positioned within a nut retainer 16 which includes a cavity 40 which is oversized compared to the lobed portion of the nut so that there is clearance between the cavity and the lobes on the sides and the bottom surface, in essence allowing the nut to float within the cavity 40. The cavity 40 includes a hole 42 so that the remainder of the nut, namely the thread engagement section and the bolt shroud sections can extend through the retainer. The diameter of hole 42 is smaller than the outside dimensions of the lobes so that the upper portion of the nut is retained within the cavity. The nut retainer 16 further includes bosses 44 and 46 positioned on either side for receipt of screws 48 and 49 for attaching the retainer to the vault as will be discussed subsequently herein. The fastening system 10 of FIGS. 1 and 2 is a floating nut version where the nut is allowed to move within the retainer to compensate for some degree of misalignment of the components being fastened together.

Figure 3:
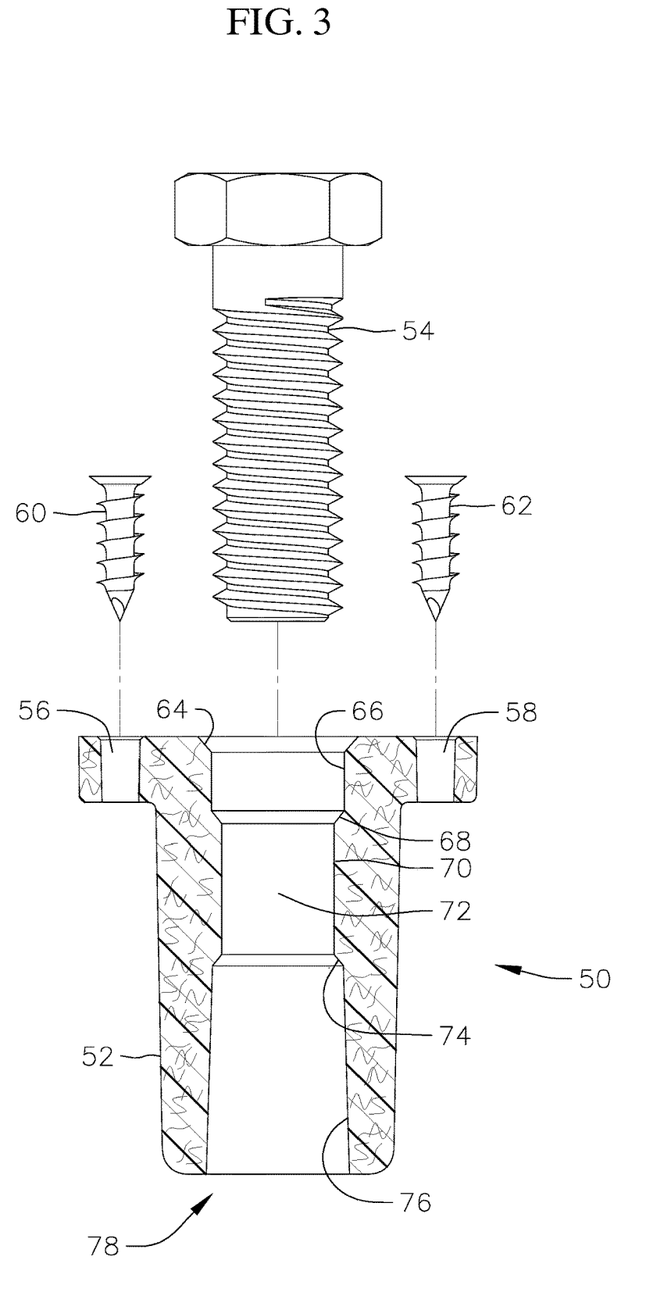
FIG. 3 is a partial cross-sectional view of an alternative embodiment fastening system.

FIG. 3 illustrates an alternative embodiment fastening system 50 which utilizes a fixed nut 52 and a bolt 54. Fastening system 50 does not utilize a nut retainer as with fastening system 10 as fixed nut 52 includes holes 56 and 58 for receipt of screws 60 and 62 respectively for rigidly fixing the nut to one of the components to be fastened together as will be discussed in more details subsequently herein. Fixed nut 52 otherwise is similar to nut 14 having a bolt lead-in chamfer 64, a bolt alignment section 66, a thread engagement section lead-in chamfer 68, a thread engagement section 70, a bolt shroud section lead-out chamfer 74 and a bolt shroud section 76 all within hole 78 extending through the nut.

Figure 4:
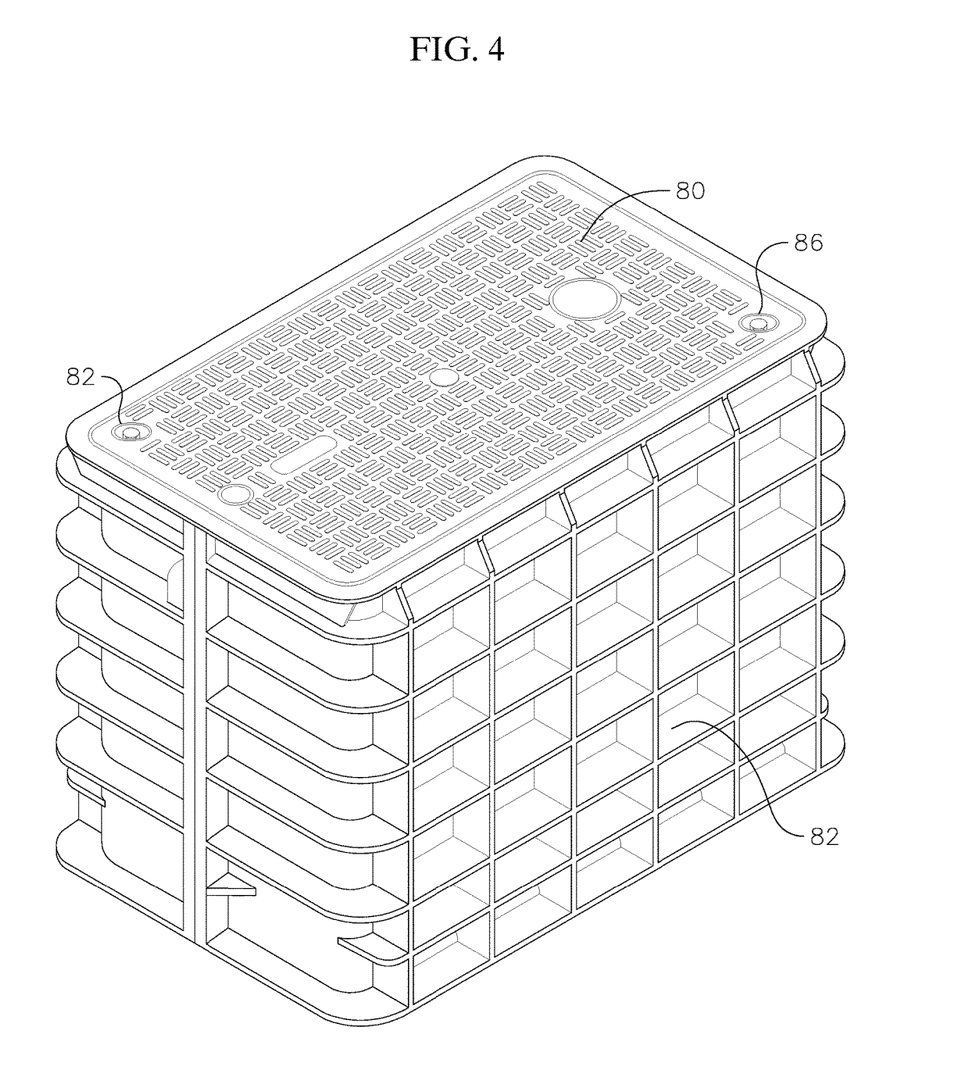
FIG. 4 is a perspective view of an underground vault, pit, chamber or box having a lid or cover attached by the fastening system of FIG. 1 or 3.
Figure 5:
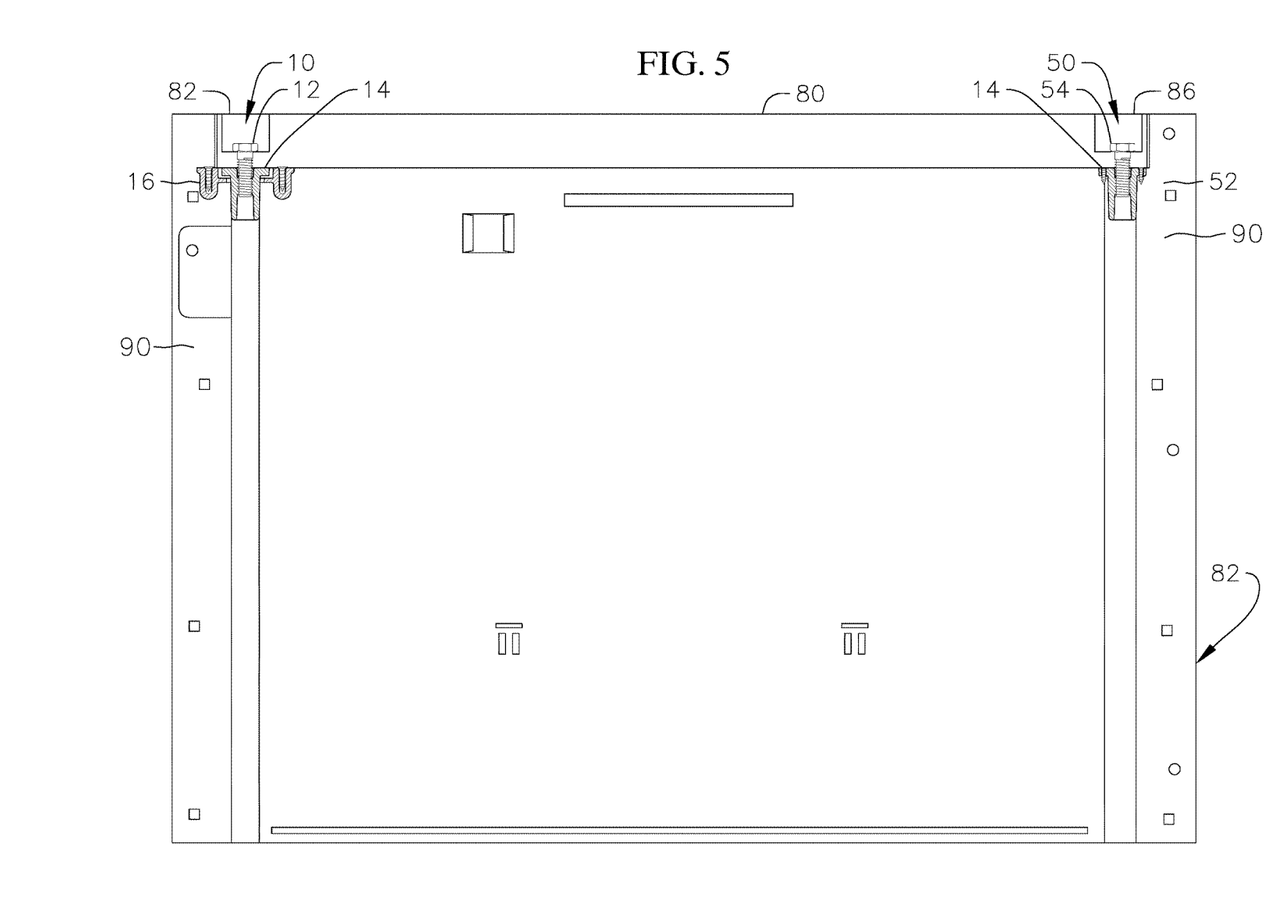
FIG. 5 is a cross sectional view of FIG. 4.

Both embodiments of the fastening system of the present invention have been designed for attaching a lid or cover 80 to and vault, pit, chamber or box 82 as shown in FIGS. 4 and 5. The lids 80 can be made from concrete, polymer concrete, cast iron, galvanized steel or plastic and more recently from a fiber glass reinforced polymer matrix material consisting of an unsaturated polyester thermosetting resin matrix, glass fiber reinforcement and inorganic or mineral filler. The vaults 82 can also be made from any of these materials. The cover or lid 80 includes through-holes 84 and 86 positioned in opposing corners of the lid. Either of fastening systems 10 or 50 are incorporated to rigidly attach the lid 80 to the vault 82, which for illustration purposes fastener 10 is illustrated as being positioned through through-hole 84 and fastener 50 is positioned through through-hole 86. It is to be understood that either or both of the fastening systems can be utilized depending upon the particular requirements. With respect to fastening system 10, nut retainer 16 would be fastened to a perimeter ledge of an inside wall of the vault so that bolt 12 would be threaded into nut 14 positioned below the lid. Bolt 19 would secure the lid to the ledge of the vault. Fastener system 50 would entail securing fixed nut 52 to the ledge of the inner wall such that bolt 54 would be threaded into the nut through thru-hole 86 thereby clamping the lid onto the vault.

An advantage of the present invention fastening system is that the failure mode of the system has been moved to the threads contained by the nut such that the bolt, nut retainer and nut attachment points remain intact allowing essentially the nut to strip out without damaging anything else and the bolt can still be removed. By careful selection of the materials that the nut, bolt and retainer are made from, the desired mode of failure is realized and the properties of the failure mode are designed to allow the threads and the nut to strip out prior to any other failure mode. This is accomplished by manufacturing the nuts out of a composite material such as, but not limited to, glass filled nylon which exhibits good strength but allows the nut threads to shear prior to any other mode of failure. By controlling the length of thread engagement and the hole diameter relative to the bolt diameter the fastening system is able to meet standard torque requirements and still allow the nut threads to fail first when over-torqued. Consequently adjustments of the material, hole diameter and thread engagement can be designed to achieve the desired result. Due to high-stress risers in the nut during thread formation, the lead-in and lead-out chamfers prevent fracture of the nut and the chamfers can be 45 degrees having a 1/16th inch to 1/8th inch length across the flat. Typically, the very course lag bolt type threads are utilized for the thread engagement section of the nut as they are ideal at forming threads in composites allowing the nut material to achieve high-torque limits required but ultimately cause the nut-threads to fail in shear. The composite material and design geometries of the nut work in a complimentary way such that the bolt can be removed even after the threads and the nut have been stripped. Further, in most instances the bolt can be reinstalled and removed albeit at a much lower level of clamping load. This is particularly useful when replacement parts are not immediately available and the bolts still provides some level of tamper resistance for the cover and vault assembly until repair can ultimately be achieved.

Another advantage of the fastening system of the present invention is that the composite materials and the thread geometries greatly negate the effects of particulate in the nut and bolt thread interface. A more compliant but resilient material utilized for the nut allows for particulates to somewhat press into the nut material without significant damage, coupled with a very course bolt thread preventing the bolt and nut threads being locked together. Second, due to composite material selections, as the bolt threads move over the particulate captured in the nut the particulate is crushed and ground into finer and finer particulate which then is driven out the bottom of the nut or falls out when the bolt is removed. The fastener system is self-clearing.

The composite materials utilized for the nut include glass fiber-filled nylons or similar engineered plastics with fiber or particulate fillers. Such fillers could include aramid fibers such as Kevlar and Nomex, carbon fiber, various glass fibers, boron, metal strands and tungsten which give a material to grind the particulates against as the bolt is driven into the nut. It is the combination of resilience of the polymer and the hardness and the edginess of the filler that prevents the nut from seizing and the particulates to be ground into smaller sizes and preventing seizure of the fastening system. In place of or in addition to the fibers, hard particulates can be integrated into the composite matrix such as carbides, ceramics, or minerals such as garnet and sapphire and others such that they act as a medium for the particulates to be ground against.

Another advantage of the fastening system of FIGS. 1 and 2 or the floating nut version is that the composite material and geometry selections ensures that the failure mode occurs at the nut threads and not at the nut and nut retainer interface. Prior fastening systems provided a failure scenario where the nut would spin within the retainer when the nut and bolt thread seized together thus preventing removal of the bolt. The composite material selection and geometry of fastening system 10 ensures that the threads fail first making certain the ability to remove the cover in the event of failure. In addition, lobes 36 and 38 provide for clearance in the X, Y and Z axis to accommodate misalignment in the X and Y axis along with angular misalignment. Although two lobes are illustrated additional geometries are available to further enhance the durability of the nut and nut retainer interface. Such geometries could include one, or more than two protrusions or lobes that mesh between the nut and the retainer, zero thrust angle interfaces or splines which are all designed to allow for relative movement between the nut and the nut retainer while exhibiting the ability to remain intact until after the nut threads fail in shear loading.

Another advantage of the fastening system of the present invention is the bolt alignment section of the nut. The bolt alignment section approximates the outer diameter of the bolt and aligns the bolt prior to entering the threaded alignment section. Self-aligning features are common on bolts but not on nuts. The bolt alignment section assures the bolt enters the nut at near co-alignment of the bolt shaft with the nut centerline, which yields consistent torque to seating values and torque to failure values.

Another advantage of the fastening system of the present invention is the incorporation of the bolt shroud section in the nut which covers the portion of the bolt that extends past the threaded engagement section. This is important for uses in vault applications requiring all metal components to be covered for electrical conduction reasons and also provides physical protection for contents in the vault from the bolt.

Another advantage of the fastening system of the present invention is that the composite material for the nut dramatically increases the torque to remove the bolt from the nut and substantially improves resistance to loosening from vibration or other stresses. Due to the enhanced prevailing torque feature for the fastening system of the present invention very high torque can be applied to the fastening system without the individual components loosening. The result is that very low axial compression or even zero axial compression is required to keep the fastening system in place. This is particularly advantageous when mating composites or other crush sensitive materials. The sensitive component can be joined to other crush sensitive materials or to non-crush sensitive materials without damage or concern about them becoming loose over time due to vibration, expansion/contraction cycles, joint compression creep or stress relaxation.

It is to be understood that although the fastening system of the present invention has been developed for application in underground or grade level containment box and cover systems, the fastening system has wide spread application in nut/bolt fastening systems and is to be understood that the invention is equally applicable to all scenarios where two components are to be joined and is not to be limited to only utility vault/cover applications.

Although the present invention has been disclosed and illustrated with respect to various embodiments thereof, it is to be understood that changes and modifications can be made therein which are within the full intended scope of the invention as hereinafter claimed.

What is claimed is:

1. A fastening system for attaching a cover to an underground vault comprising:
    a bolt having threads; and
    a composite fiber reinforced polymer nut having an unthreaded thread engagement portion extending through at least a portion of the nut, wherein the unthreaded thread engagement portion forms thread after receiving the bolt and fails in shear before the nut and bolt seize
    wherein the nut further includes an unthreaded cylindrical bolt alignment portion positioned above the thread engagement portion, and
    wherein the nut further includes an unthreaded cylindrical bolt shroud section positioned below the thread engagement portion, both the unthreaded bolt alignment portion and the unthreaded bolt shroud section having a diameter greater than a diameter of the unthreaded thread engagement portion and the unthreaded bolt shroud section has an opening below the bolt.

2. The fastening system of claim 1 further comprising a nut retainer sized to allow the nut to float within the nut retainer.

3. The fastening system of claim 2 wherein the nut retainer has a cavity for receipt of at least a portion of the nut and sized for preventing the nut from fully rotating in the nut retainer.

4. The fastening system of claim 2 wherein the nut retainer has mounting holes.

5. The fastening system of claim 1 wherein the nut further includes a lead-in chamfer and a lead-out chamfer adjacent the thread engagement portion.

6. The fastening system of claim 1 wherein the nut includes at least one lobe extending radially outwardly from a portion of the nut.

7. The fastening system of claim 6 wherein there are two lobes each having a hole for receipt of a fastener.

8. The fastening system of claim 1 wherein the composite fiber reinforced polymer nut is glass filled nylon.

9. The fastening system of claim 1 wherein the composite fiber reinforced polymer nut is an engineering plastic with fiber or particulate filler.

10. The fastening system of claim 9 wherein the fiber is at least one of aramid fiber, carbon fiber, glass fiber or metal strand.

11. The fastening system of claim 9 wherein the particulate filler is at least one of carbide, ceramic or mineral.

12. A fastening system for attaching a lid to an underground box comprising:
a threaded bolt; and
a fiber reinforced composite nut having an unthreaded thread engagement portion extending through at least a portion of the nut wherein threads are formed in the unearthed thread engagement portion upon receipt of the bold and particulates trapped between the bolt and the thread engagement portion of the nut have a first portion pressed into the nut and a second portion crushed and driven out of the bottom of the nut,
wherein the nut further includes an unthreaded cylindrical bolt alignment portion positioned above the thread engagement portion and an unthreaded cylindrical bolt shroud portion positioned below the thread engagement portion, both of the unthreaded bolt alignment portion and the bolt shroud portion having a diameter larger than a diameter of the unthreaded thread engagement portion and the second portion of particulates are driven out of the nut through an opening at the end of the unthreaded cylindrical bolt shroud portion.

13. The fastening system of claim 12 further comprising a nut retainer and wherein the nut includes at least one lobe extending radially outwardly in a portion of the nut so that the nut floats within the nut retainer.

14. The fastening system of claim 12 wherein the fiber reinforced composite nut comprises glass-filled nylon.

15. The fastening system of claim 12 wherein the fiber reinforced composite nut comprises an engineering plastic with fiber or particulate filler.

16. The fastening system of claim 15 wherein the fiber is at least one of aramid fiber, carbon fiber, glass fiber or metal strand.

17. The fastening system of claim 15 wherein the particulate filler is at least one of carbide, ceramic or mineral.

* * * * *

UNITED STATES PATENT AND TRADEMARK OFFICE
CERTIFICATE OF CORRECTION

PATENT NO. : 10,288,106 B2  
APPLICATION NO. : 15/177277  
DATED : May 14, 2019  
INVENTOR(S) : Michael A. Lemacks Page 1 of 1

It is certified that error appears in the above-identified patent and that said Letters Patent is hereby corrected as shown below:

In the Claims  
Column 8, Line 1, Claim 12     delete "unearthed",  
                                                 insert -- unthreaded --

Signed and Sealed this  
Thirty-first Day of March, 2020

Andrei Iancu  
*Director of the United States Patent and Trademark Office*